US011597246B1

(12) United States Patent
Klein et al.

(10) Patent No.: US 11,597,246 B1
(45) Date of Patent: Mar. 7, 2023

(54) MECHANICAL SLIDER SUSPENSION OPTIMIZED WITH AIR RIDE

(71) Applicants: Jason M. Klein, Springfield, MO (US); Kevin C. Schlack, Nixa, MO (US)

(72) Inventors: Jason M. Klein, Springfield, MO (US); Kevin C. Schlack, Nixa, MO (US)

( * ) Notice: Subject to any disclaimer, the term of this patent is extended or adjusted under 35 U.S.C. 154(b) by 0 days.

(21) Appl. No.: 17/552,809

(22) Filed: Dec. 16, 2021

Related U.S. Application Data

(63) Continuation-in-part of application No. 16/531,767, filed on Aug. 5, 2019, now abandoned, which is a continuation-in-part of application No. 16/357,877, filed on Mar. 19, 2019, now abandoned.

(60) Provisional application No. 62/645,265, filed on Mar. 20, 2018.

(51) Int. Cl.
*B60G 11/46* (2006.01)
*B60G 7/02* (2006.01)
*B60G 17/052* (2006.01)

(52) U.S. Cl.
CPC ............. *B60G 11/465* (2013.01); *B60G 7/02* (2013.01); *B60G 17/0521* (2013.01); *B60G 2202/15* (2013.01); *B60G 2204/121* (2013.01); *B60G 2204/126* (2013.01); *B60G 2204/143* (2013.01); *B60G 2206/71* (2013.01); *B60G 2206/72* (2013.01); *B60G 2500/30* (2013.01); *B60G 2800/162* (2013.01)

(58) Field of Classification Search
CPC .... B60G 11/465; B60G 7/02; B60G 17/0521; B60G 2202/15; B60G 2204/121; B60G 2204/126; B60G 2204/143; B60G 2206/71; B60G 2206/72; B60G 2500/30; B60G 2800/162
See application file for complete search history.

(56) References Cited

U.S. PATENT DOCUMENTS

| 1,714,067 | A  | 8/1927  | Angelus ................... F16F 9/02 |
| 2,455,989 | A  | 12/1948 | Frazier ................... B60G 5/047 |
| 2,577,322 | A  | 12/1951 | Frazier ................... B60G 5/047 |
| 2,653,035 | A  | 9/1953  | Ward ...................... B60G 5/057 |
| 3,123,377 | A  | 3/1964  | Hutchens ............... B60G 5/047 |
| 5,271,638 | A  | 12/1993 | Yale ....................... B60G 11/465 |
| 6,224,074 | B1 | 5/2001  | Cadden ................... B60G 5/02 |
| 6,991,223 | B2 | 1/2006  | Platner et al. ........... B60G 7/04 |
| 7,850,195 | B2 | 12/2010 | Simard et al. .......... B60G 5/047 |
| 9,016,705 | B2 | 4/2015  | Prikkel, III ............. F16F 1/185 |
| 2007/0145656 | A1 | 6/2007 | Svendsen ............... B60G 5/00 |
| 2007/0145706 | A1 | 6/2007 | Penzotti ................. B60G 11/12 |
| 2010/0253032 | A1 | 10/2010 | Ramsey ................. B60G 11/27 |
| 2012/0200057 | A1 | 8/2012 | Juriga ..................... B60G 11/12 |
| 2014/0117639 | A1 | 5/2014 | Ramsey ................. B60G 5/00 |
| 2014/0191486 | A1 | 7/2014 | Rarey ..................... B60G 11/04 |
| 2018/0257449 | A1 | 9/2018 | Delorenzis ............ F16F 9/0418 |

*Primary Examiner* — Darlene P Condra

(74) *Attorney, Agent, or Firm* — Jonathan A. Bay

(57) ABSTRACT

A leaf spring suspension is provided with an air spring to absorb a percentage of the load.

14 Claims, 19 Drawing Sheets

MECHANICAL SLIDER SUSPENSION OPTIMIZED WITH AIR RIDE

CROSS-REFERENCE TO PROVISIONAL APPLICATION(S)

This application is a continuation-in-part of U.S. patent application Ser. No. 16/531,767, filed Aug. 5, 2019; which is a continuation-in-part of U.S. patent application Ser. No. 16/357,877, filed Mar. 19, 2019; which claims the benefit of U.S. Provisional Application No. 62/645,265, filed Mar. 20, 2018. The foregoing patent disclosures are incorporated herein by this reference thereto.

BACKGROUND AND SUMMARY OF THE INVENTION

The invention relates to heavy duty vehicle suspensions and, more particularly, to improvements to a slipper spring type mechanical leaf spring suspension system that is optimized with an air ride.

Such suspension systems typically include a control arm, which control arm is variously referred to by other names such as torque arm or torque rod.

As an aside, when a tire hits a bump in the road, the suspension moves upward, and this is called compression or "jounce." When the suspension returns to its original position, this is called "rebound." Again, "jounce" is the upward movement or compression of suspension components. "Rebound" is the downward movement or extension of the suspension components.

Mechanical leaf spring suspension systems have been commonplace in the trailer industry for a long time. Nowadays, Air-ride axle suspension systems have become popular in heavy-duty tractor trailer industry in the last twenty years because of their improved ride characteristics, driver comfort and maneuverability over obstacles. The drawback to air ride suspension systems are their complexity of design and increased service parts when compared to a slipper spring type mechanical leaf spring suspension system.

The largest segment of the domestic heavy duty van trailer Market uses mechanical suspension on a sliding subframe design.

With reference to FIGS. 1 through 2c show an example Slipper Spring Mechanical Suspension System 20a in accordance with the prior art, and these are taken from U.S. Pat. No. 3,123,377—Hutchens. In FIG. 1, the torque arm 22a is pivoted at its front end where line II-II cuts through it, and FIG. 2a shows a torque arm pivot bushing 24a likewise in accordance with the prior art.

Slipper spring suspension systems 20a perform well to Vertical load inputs when the vehicle 30 is loaded but do not when the slipper Springs 26a are lightly loaded. Also, a classical slipper spring suspension 20a in accordance with the prior art uses a spring 26a that has two unrestrained ends 28a that slip on vehicle frame 32 hangers 34a with wear pads 36a. The spring 26a is held in place by suspension control arms 22a, which as said above, can also be referred to as torque rods 22a.

With reference to FIGS. 3 and 4, these show a mechanical suspension 20b in accordance with the prior art and provided with a jounce bumper 42. So in addition to standard leaf springs 26a (see, eg., FIGS. 1 through 2c), a mechanical suspension 20b can accommodate steel or composite style leaf springs 26b with a jounce bumper 40. The configuration with the jounce bumper 40 allows for lighter-weight springs 26b. The jounce bumper 40 is a rubber bumper anchored on a leaf spring 26b but unattached at the top and provides an "Up" or "jounce" stop due to the resiliency of the rubber.

When the tire 44 (see, eg., FIG. 1 for tire 44) hits a bump in the road, the jounce bumper 40 is compressed into the vehicle frame 32 or, as more modernly preferred, the sliding subframe 46 which hangs the suspension 20b. When the suspension 20b "rebounds," the jounce bumper 40 separates from the sliding subframe 46 because it is unattached, and creates a gap. When the gap is closed, there is a slap or a slam. The slap or slam of the jounce bumper 40 into the sliding subframe 46 is not so destructive to the suspension overall. But it does contribute to a rough ride, and it may be destructive to delicate cargo or freight.

So for example, a tandem axle 48 semi trailer (eg., vehicle 30) might have a load rating of 17,000 lbs. per axle. As the tires 44 (again, see FIG. 1 for tire 44) ride over a curb, all or substantially all of the load might be transferred to one axle 48, while the other axle 48 goes substantially unloaded. One of the four jounce bumpers 40 might separate and form a gap, and hence it is not doing its job.

Other prior art mechanical leaf spring and air-ride units include these.

U.S. Pat. No. 1,714,067, entitled "vehicle spring," shows a combination of an eyed leaf spring and a rolled-lobe style (eg., piston bag style) air spring.

U.S. Pat. No. 5,271,638, entitled "truck steering stabilizer," shows a fixed tandem steering axle configuration using a leaf spring and air spring in combination.

U.S. Pat. No. 7,850,195, entitled "tandem suspension for steerable axles," has a fixed tandem steering axle configuration using a leaf spring and air spring in combination.

U.S. Pat. No. 6,991,223, entitled "composite leaf spring having an arcuate attachment arrangement for vehicle mounting," shows a composite leaf spring and stop combination.

US Pub App No. 2014/0,117,639, entitled "mechanical spring axle suspension system for a heavy duty vehicle," shows a tandem configuration using a leaf spring suspension on a sliding subframe.

SUMMARY OF THE INVENTION

It is an aspect of the invention is to solve the problems inherent with sliding subframe leaf spring suspensions of poor ride quality when lightly loaded by doing the following. That is, by incorporating an air spring to absorb a percentage of the load when unladen as well as laden to improve ride quality of an axle suspension system for a heavy duty Vehicle's sliding subframe. This new slider design is a hybrid mechanical and air suspension system to get features from both.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

DETAILED DESCRIPTION OF THE PREFERRED EMBODIMENTS

Figure 1:
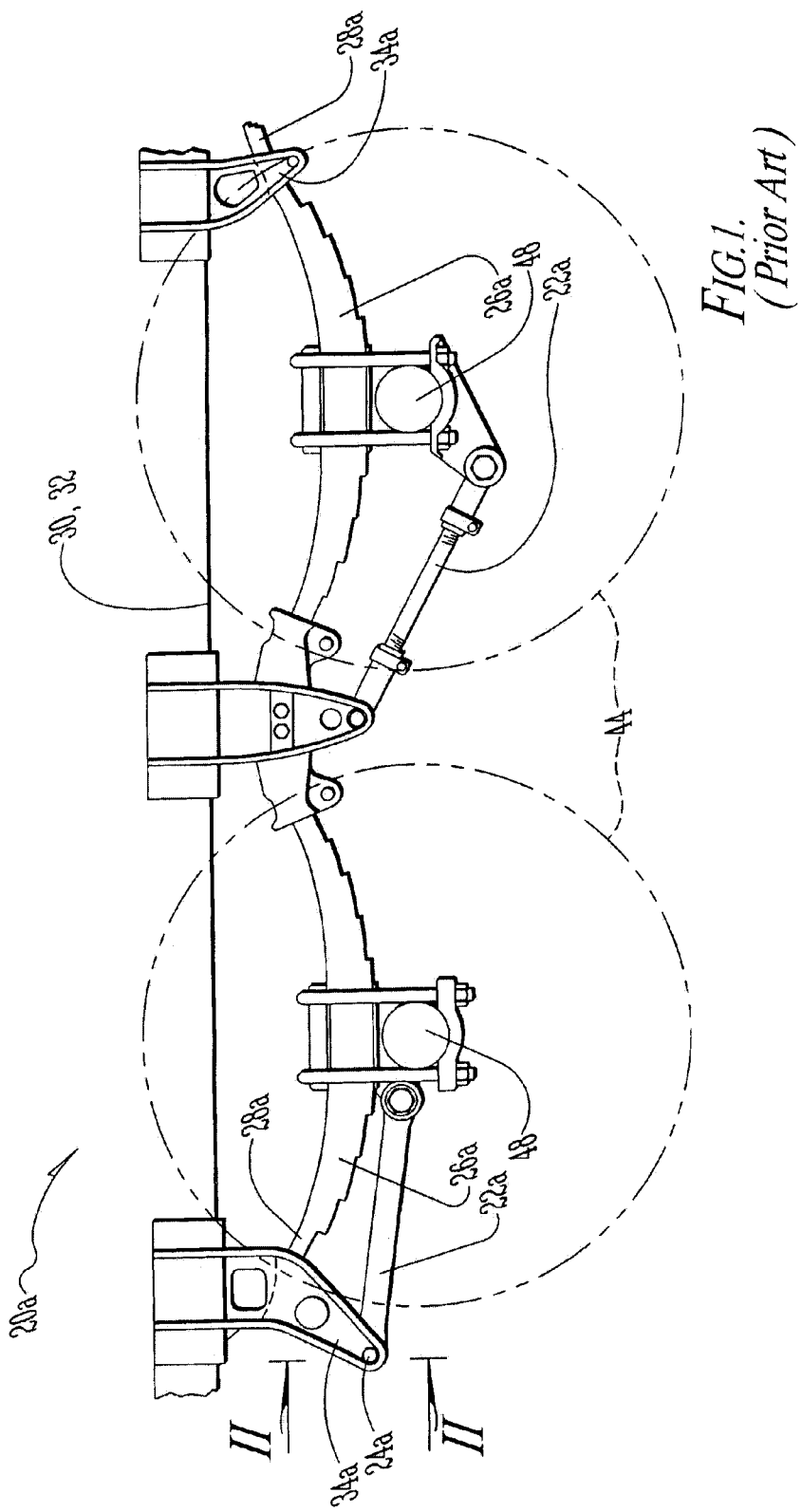
FIG. 1 is a side elevation view of a Slipper Spring Mechanical Suspension System in accordance with the prior art and corresponds to FIG. 1 of U.S. Pat. No. 3,123,377—Hutchens.
Figure 2A:
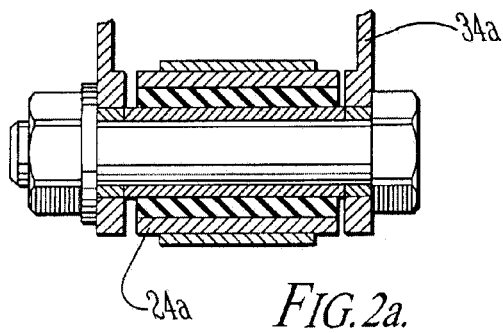
FIG. 2a is an enlarged-scale section view in accordance with the prior art, taken along line II-II in FIG. 1, and corresponds to FIG. 2 of U.S. Pat. No. 3,123,377—Hutchens.
Figure 2B:
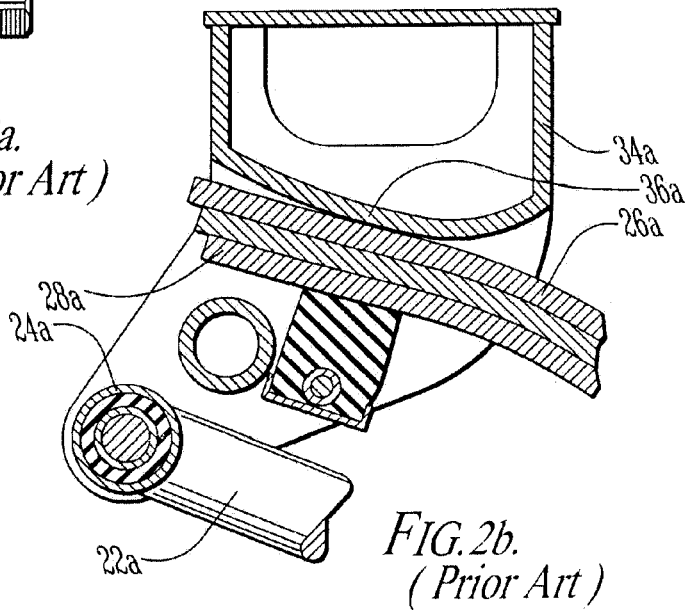
FIG. 2b is an elevation view, generally in section, showing a connection in accordance with the prior art of a front leaf spring assembly to a forward spring hangar bracket and corresponds to FIG. 4 of U.S. Pat. No. 3,123,377—Hutchens.
Figure 2C:
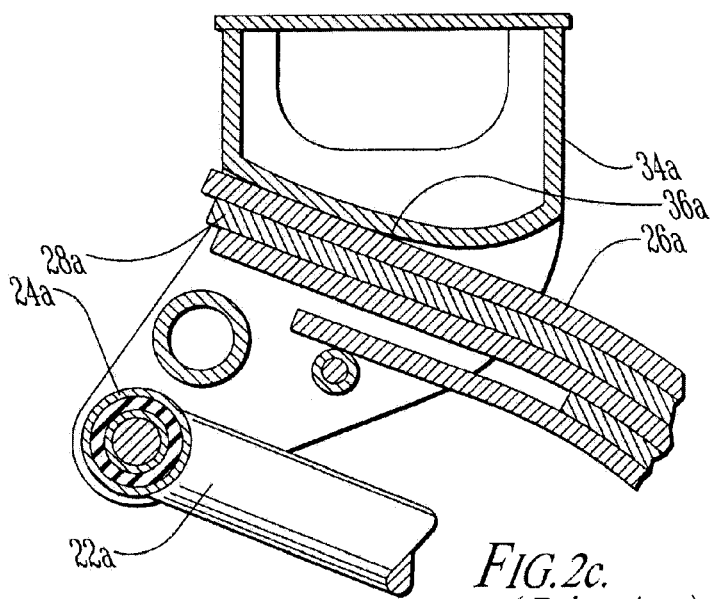
FIG. 2c is an elevation view, generally in section, showing an alternate connection in accordance with the prior art of a front leaf spring assembly to a forward spring hangar bracket and corresponds to FIG. 5 of U.S. Pat. No. 3,123,377—Hutchens.
Figure 3:
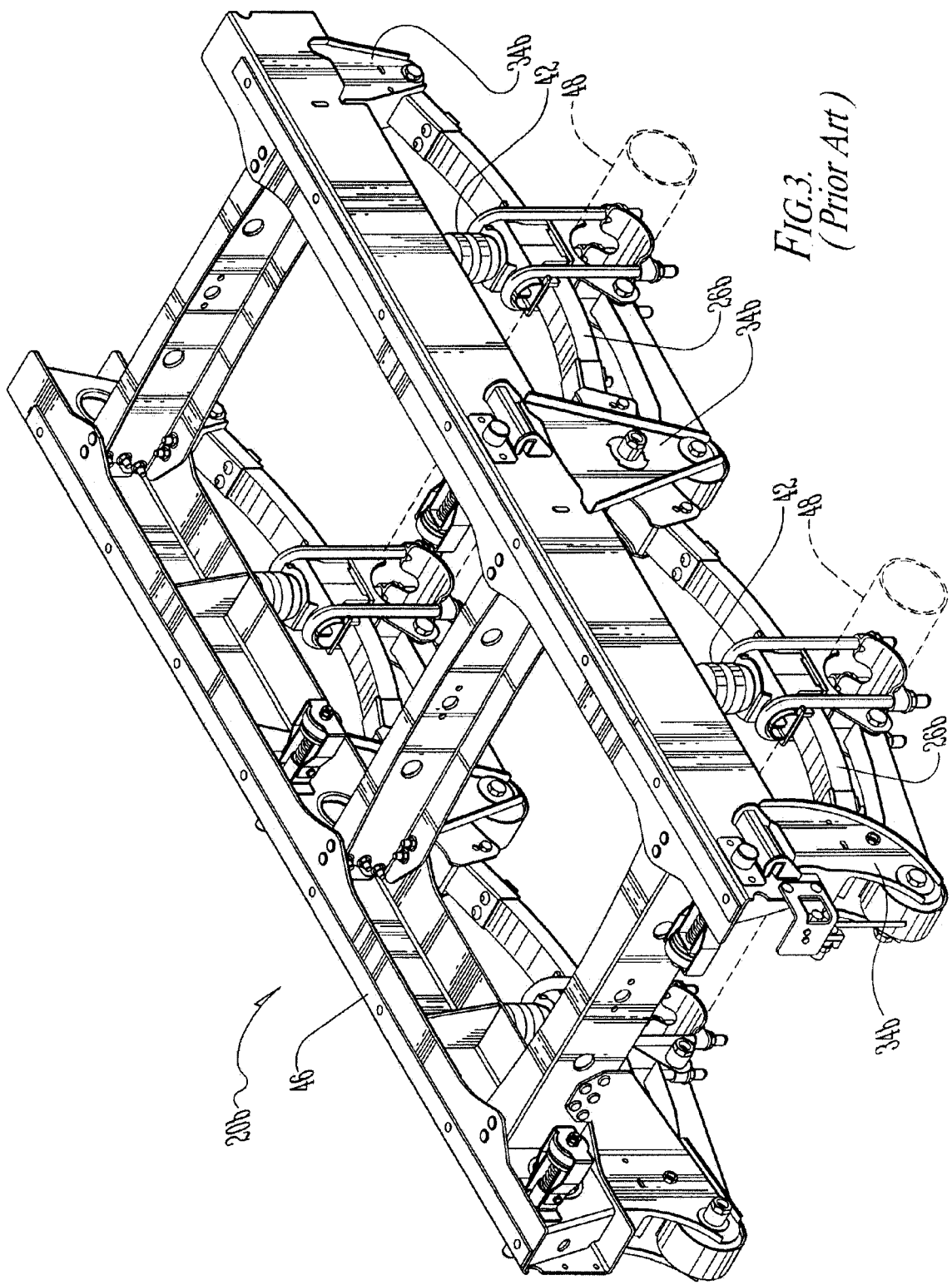
FIG. 3 is a perspective view of a mechanical suspension with a jounce bumper in accordance with the prior art.

FIGS. 5-12 show a mechanical slider suspension 50/20c that is optimized with an air ride 52 in accordance with the invention.

It is an object of the present invention to solve such problems inherent with leaf spring suspensions (eg., 20a and/or 20b) as poor ride quality by incorporation of an air spring 52 to absorb a percentage of the load.

A leaf spring, slipper spring or eyed spring type axle suspension system (eg., 20a, 20b and/or 20c) for tractor trailers (eg., vehicle 30) and other heavy duty wheeled Vehicles has leaf springs (eg., 26a, 26b and/or 26c) to carry vehicle load and control arms, torque rods or an eyed spring (eg., 22a, 22b and/or 22c) to maintain axle 48 placement.

It is an aspect of the invention in which the mechanical leaf spring 22c has its lower capacity supplemented by a centered air spring assist 52 to carry some of the load in an axle/suspension system 50/20c for a heavy duty vehicle 30 subframe 46, which preferably can be a sliding subframe 46. This gives the suspension 50/20c in accordance with the invention better ride quality and can be slid forward or rearward to shift tractor loading.

It has been found that one of the key components of an effective mechanical suspension 50/20c is that as long as the leaf spring 26c is Laden it gives a better ride, while an air spring 52 can give good ride quality in the unladen mode. The leaf spring 26c slipper portion 28c can dampen the road inputs eliminating the need for a shock absorber. By combining the two spring means 26c and 52 the best of each can be taken advantage of with air spring 52 means for light loading and higher percentage of leaf spring 26c for heavy loading. This can be done on single, tandem or multi-axle 48 configurations.

The suspension 50/20c in accordance with the invention can be used with the inventors' RideMax™ oversized torque arm 22c bushing 24c to reduce fore-aft bump load inputs and improve ride quality, as well as help maintain axle 48 alignment.

This provides the air ride quality of a sliding subframe but does not need a dock lock mechanism like needed on most air ride sliders.

Air ride sliding subframe systems are usually heavier than mechanical systems because of extra support and structure required for the air ride system.

However, the incorporation of Assistant air spring 52 allows use of lighter capacity steel or composite leaf springs 26b or 26c to reduce stiffness of the mechanical spring suspension means and lower suspension total spring rate giving a better ride quality.

The assistant Air Springs 52 in accordance with the invention can be used with internal air dampening means 54 and/or 56 through use of reducing and shaping orifices 54 and/or 56 to eliminate the need for hydraulic shocks.

An air system Height Control Valve 58 can be used to regulate the pressure into the air springs 52 so that they do not overload and eliminate the connection of the leaf spring 26c and the spring hanger means 34c, which could cause spring slap.

Higher ratio of air ride 52 to improve quality when trailer (eg., vehicle 40) is unloaded and lower for Air Ride 52 when trailer (eg., vehicle 40) is loaded to get better roles of stability from the leaf spring 26c when loaded.

To refer to either the left side or right side suspension system 50/20c alone, the following is preferred. That is, it is preferred if the leaf springs 26c of that side, and air springs 52 and the spring hangers 34c are all symmetrically disposed in (eg., bisected by) a common longitudinal vertical plane "P" of symmetry (see, eg., FIG. 9). That way, at rest, there is no inherent twist in the system 50/20c. Everything is aligned for supporting a load in common longitudinal vertical plane "P."

Figure 13:
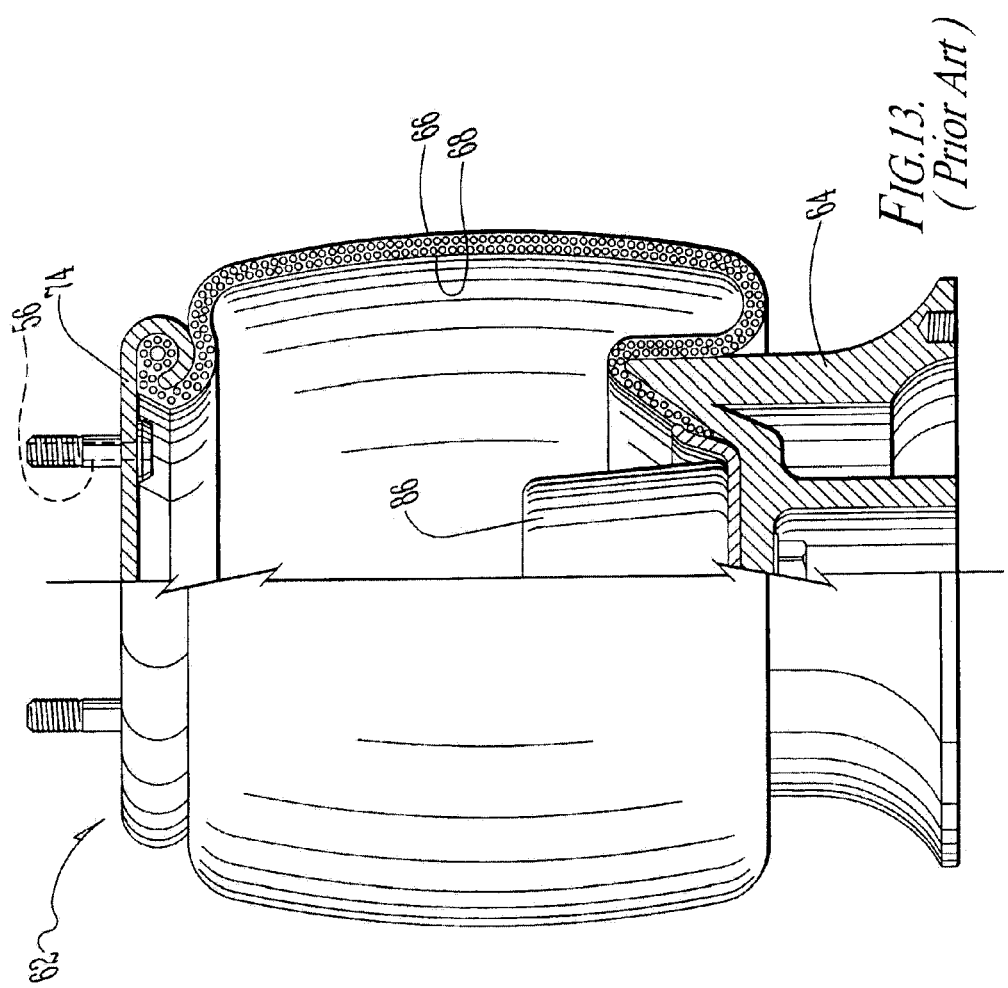
FIG. 13 is a side elevational view, partly in section, of a rolled-lobe style (eg., piston bag-type) air spring in accordance with the prior art.
Figure 14:
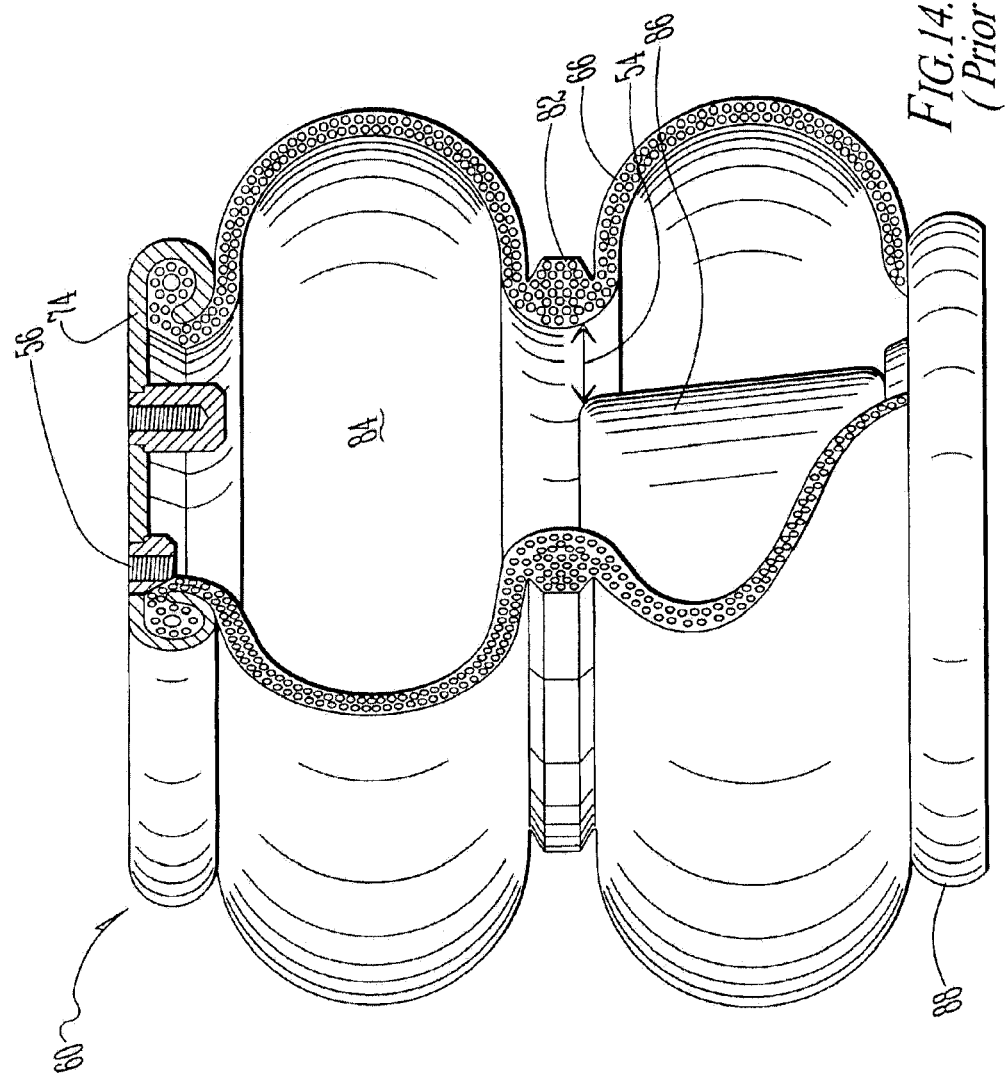
FIG. 14 is a side elevational view, partly in section, of a convolute style air spring in accordance with the prior art and preferred for utilization in the invention as bounded by detail XIV-XIV in FIG. 11.

It is furthermore preferred to utilize a convolute air spring 60 as shown better in FIG. 14 over a rolled-lobe style (eg., piston bag style) air spring 62 as better shown in FIG. 13. Convolute air springs 60 are more compact and are believed to handle off-axis loads better. Rolled-lobe air springs 62 might ride better, but do not like angles. The interior annular piston housing hardware 64 inside the bellows 66 can hit the sidewall 68.

But with either type of air spring 60 or 62, they are securely attached top and bottom between the vehicle frame 32 (or as preferred more modernly, the sliding subframe 46) and the leaf spring 26a, 26b and/or 26c (or bracket hardware 34a. 34b and/or 34c associated with the leaf spring 26a, 26b and/or 26c).

With reference to FIGS. 13 and 14, they show the following. Air springs 60 or 62 contain a column of air in an elastomeric bellow or sleeve 66 to provide suspension, isolation, or actuation.

Air springs 60 or 62 are employed through the use of an air compressor which fills and empties the pliable air bladder 66. The load is not distributed to the rubber liner 66, which only serves to contain the gas. The weight is attached to a piston or bead plate 74, which is directly supported by the air with very little deflection.

Air Springs 60 or 62 typically comprise the following components:—

Air fitting 56: A tapped hole allowing for the spring 60 or 62 to be fed from the air compressor;

Nut/bolt/mount 74 as well as 64 and 76: The method for attaching the air spring 60 or 62 to the component. Some air springs (eg., as shown with convolute air spring 60) incorporate a bolt and air fitting combination device 74;

Bead plate 74: Crimped metal plate enclosing the spring 60 or 62 and allowing attachment (this is typically forged steel, cast zinc alloy or cast aluminum);

Bellows 66: The physical, multi-layer material withholding the compressed gas (usually made of neoprene or rubber);

Girdle 82: Only found in air springs 60 of convoluted design, separating the bellows chambers 84;

Bumper 86: An optional layer of padding protecting the piston 64 and/or 74 from damage if the air spring 60 or 62 fails; and Piston 74: The component attached to the machinery (eg., vehicle 40, or more particularly vehicle frame 32 or sliding subframe 46) requiring suspension, which is in turn supported by the enclosed air.

For the convolute air spring 60, the counterpart to the annular piston housing hardware 64 in the piston bag style air spring 62 is a bottom plate 88. The piston housing hardware 64 and/or bottom plate 88 is typically attached with further hardware.

Figure 15:
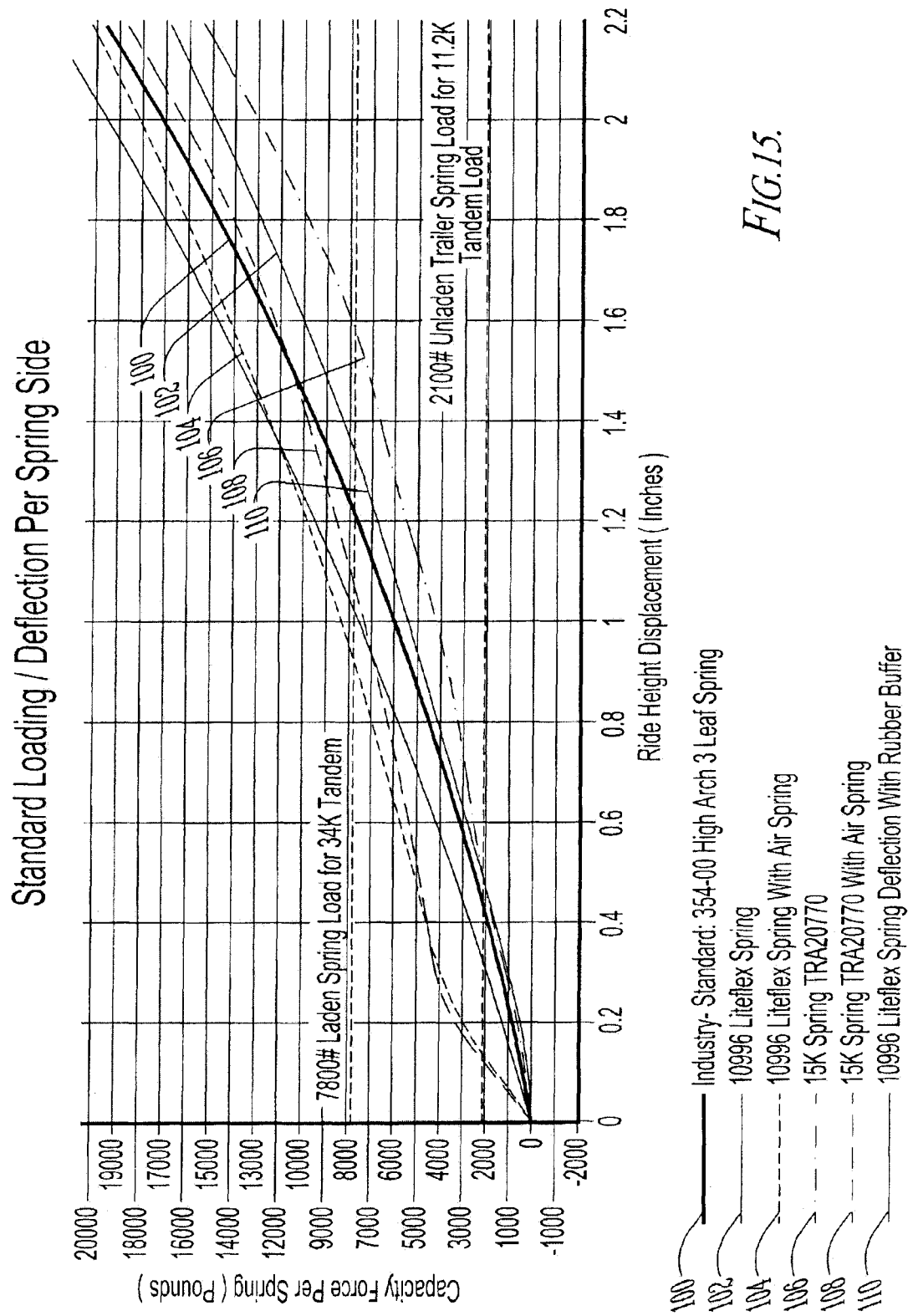
FIG. 15 is a plot entitled standard loading/Deflection per spring side, and comparing various suspension configurations.

The graph (chart) shown by FIG. 15 can be interpreted in part as follows.

Title=standard loading/deflection per spring side.

Y-axis=capacity Force/spring x-axis=ride height displacement (pounds).

X-axis=ride height displacement (inches).

Black line 100 (middle solid line—thickest solid line)=industry-standard: 354-00 high arch 3 leaf spring.

Red Line 102 (lower solid line—a thin solid line)=10996 liteflex spring.

Red dash line 104 (upper dash line≠short dashes)=10996 liteflex spring with air spring.

Green dash-dot line 106 (lowest line—and again, dash-dot line)=15K spring TRA20770.

Green dash line 108 (lower dash line—long dashes)=15K spring TRA20770 with air spring.

Blue Line 110 (upper solid line—also a thin solid line)=10996 liteflex spring deflection with rubber buffer (in units of inch/pound force).

Figure 9:
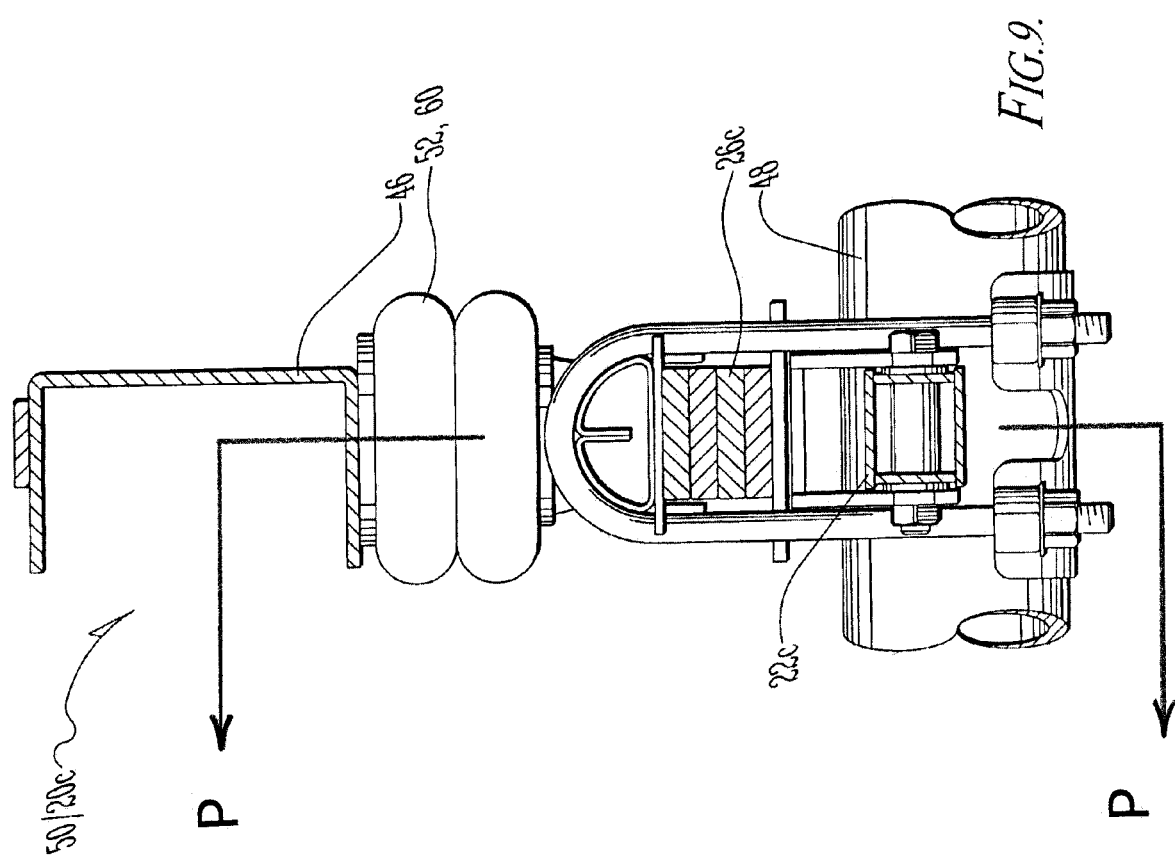
FIG. 9 is an elevational view, partly in section, take in the direction of arrows IX-IX in FIG. 8.
Figure 10:
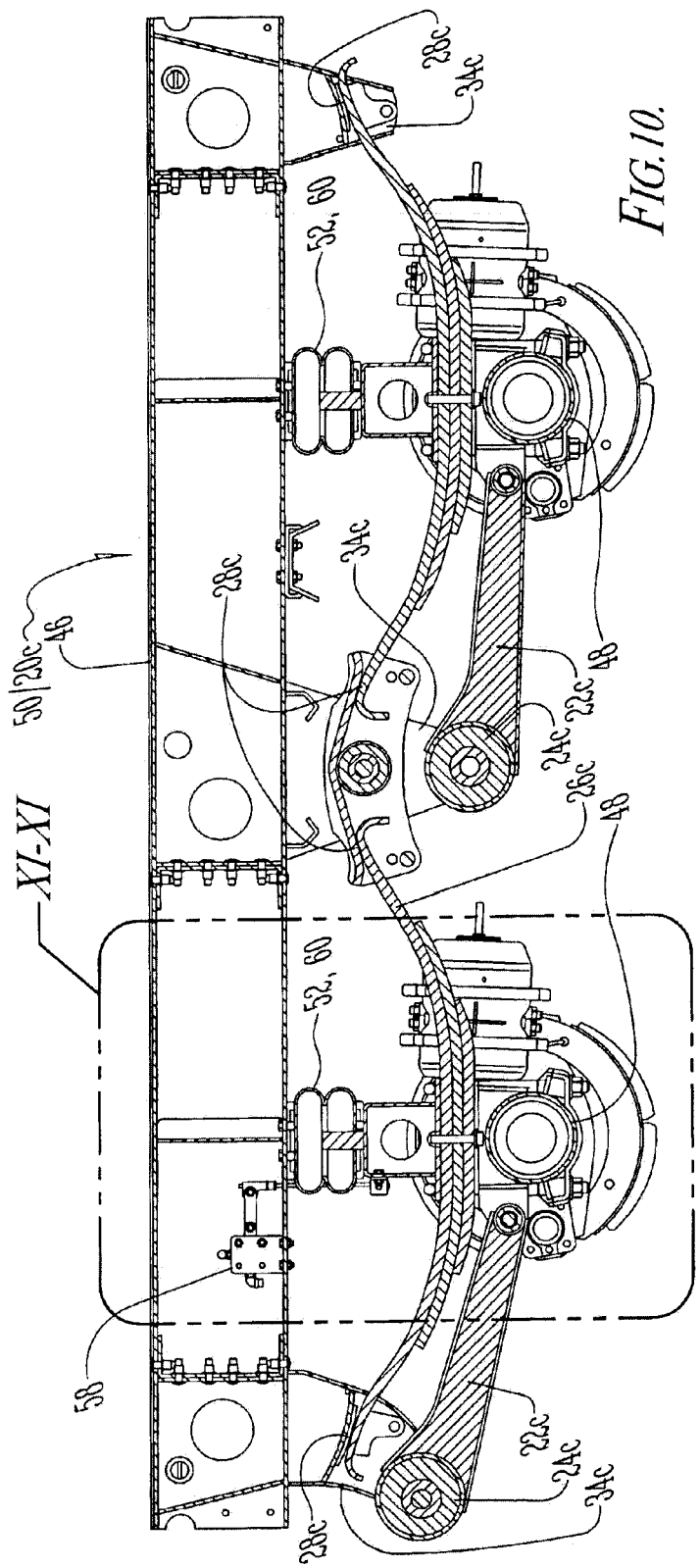
FIG. 10 is a section view corresponding to FIG. 6 except taken through a vertical longitudinal plane essentially bisecting the left-side torque arms, leaf springs, and convolute air springs through an essentially vertical longitudinal plane of symmetry therefor.
Figure 11:
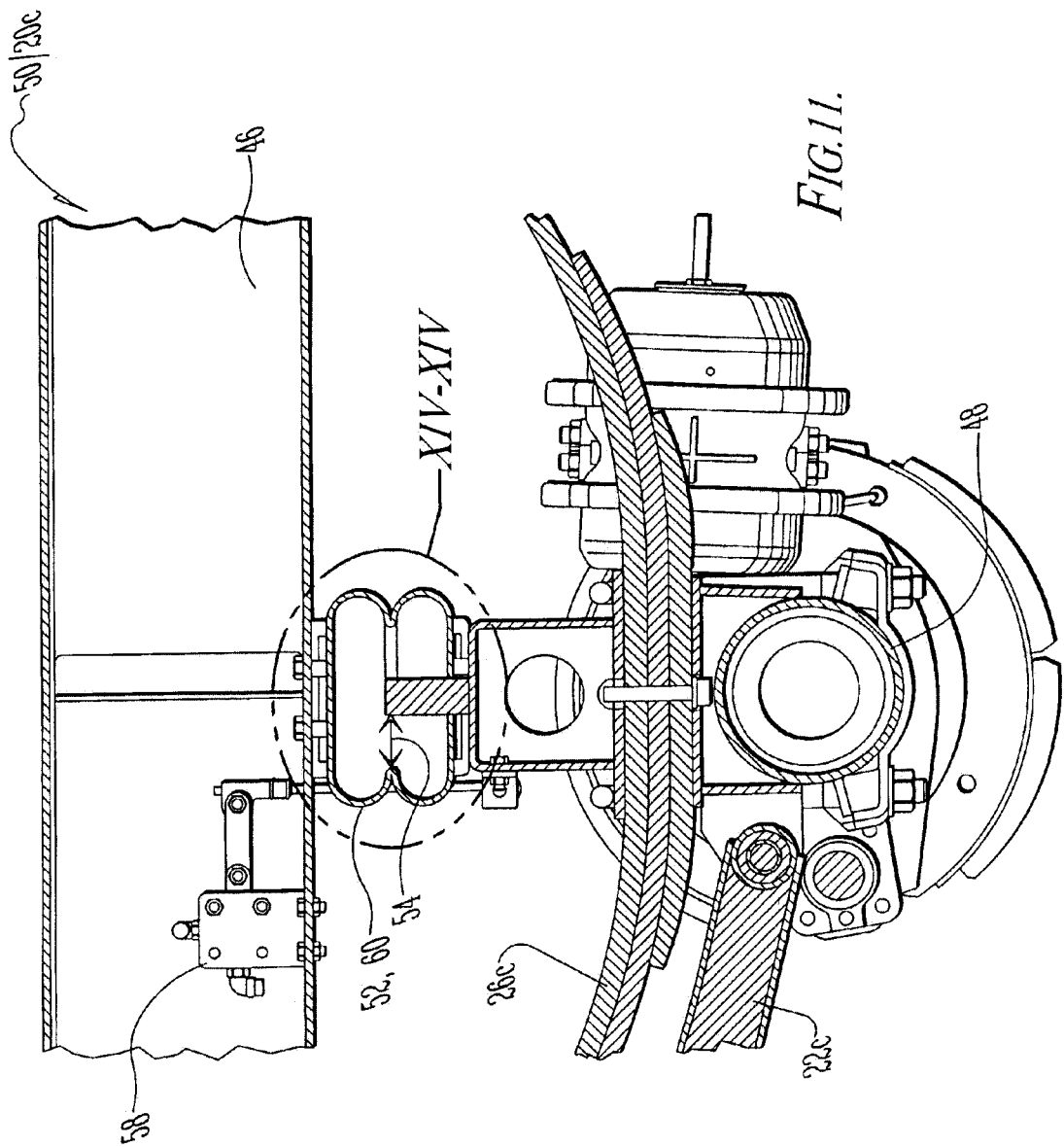
FIG. 11 is an enlarged-scale section view of detail XI-XI in FIG. 10.
Figure 12:
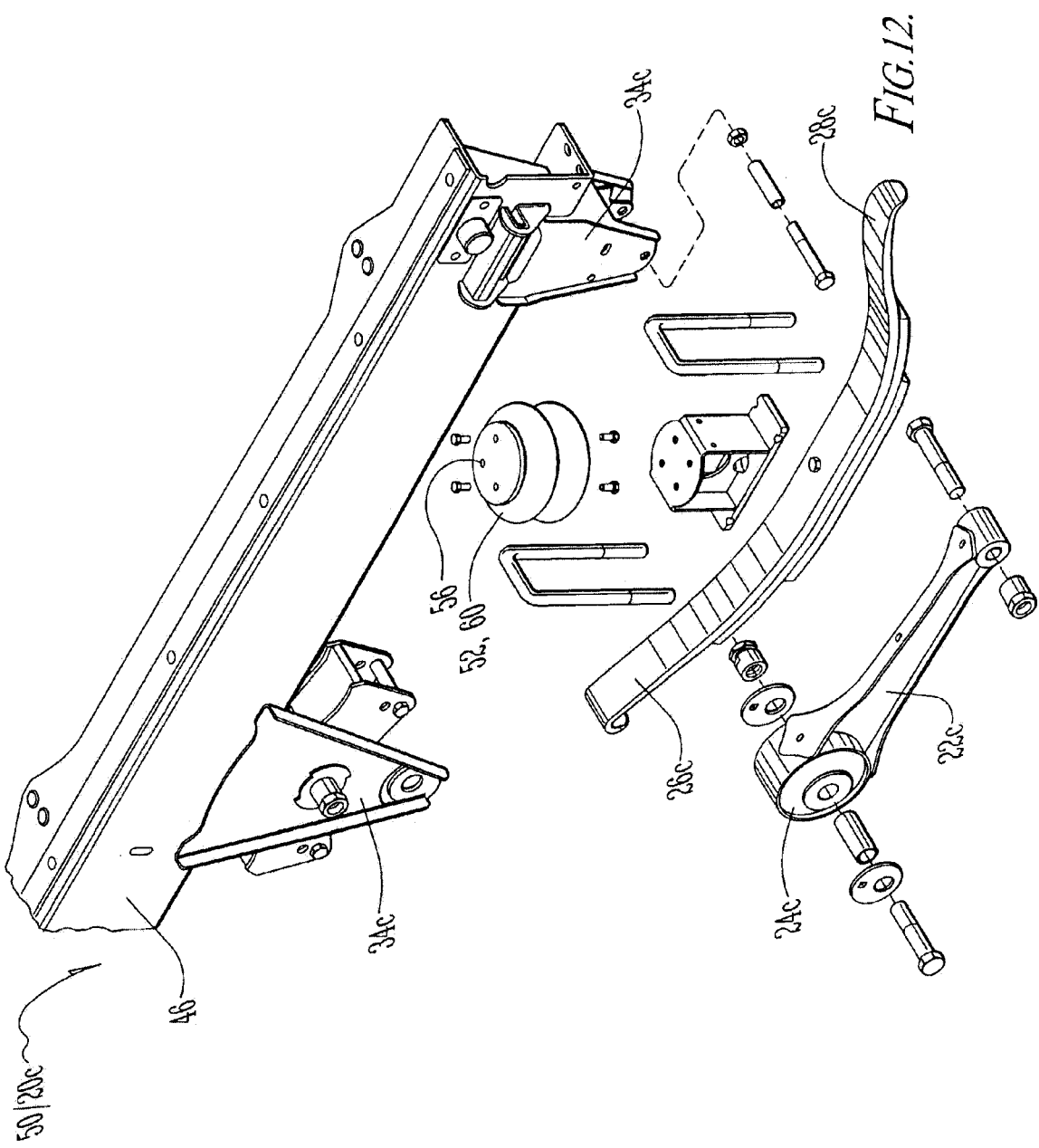
FIG. 12 is an exploded perspective view of FIG. 11 (except including the whole leaf spring and the front and rear hangers therefor, which are a little outside of the narrow detail XI-XI in FIG. 10)
Figure 16A:
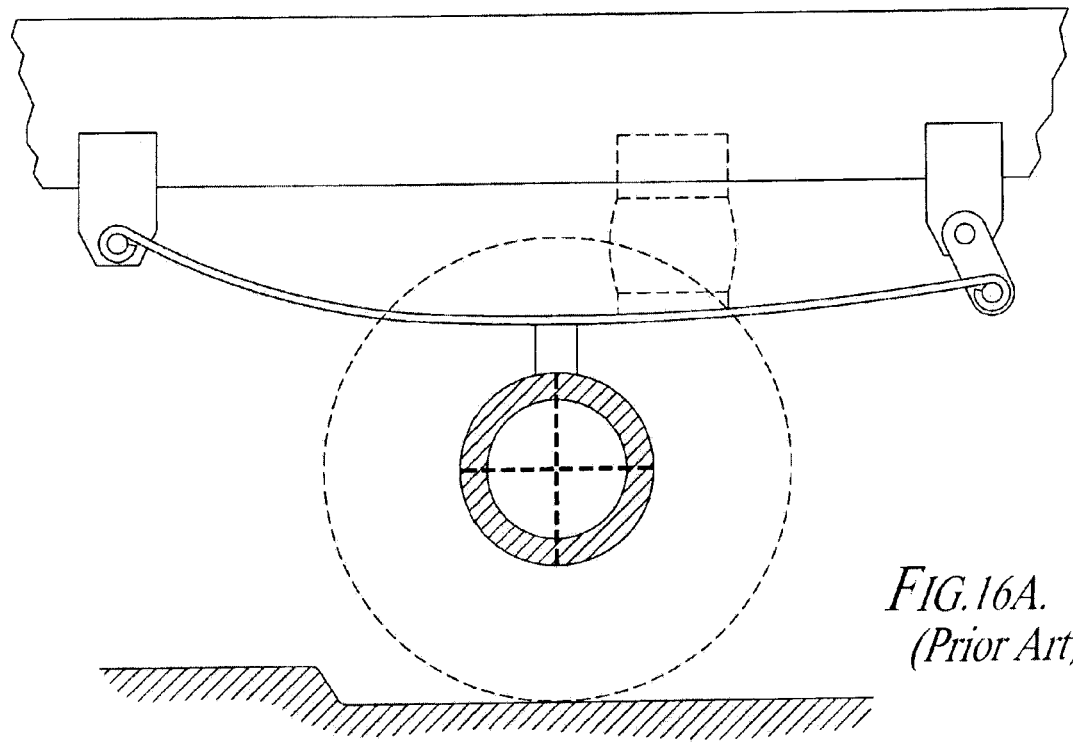
FIG. 16A is a stylized side elevation view of a non-slipper type leaf spring suspension system in accordance with the prior art and corresponds to FIG. 9 of U.S. Pat. No. 5,271,638—Yale, and showing the suspension in a relative state of at rest, as when parked or else motoring down a relatively smooth level roadway.

FIG. 16A is a stylized side elevation view of a non-slipper type leaf spring suspension system in accordance with the prior art and corresponds to FIG. 9 of U.S. Pat. No. 5,271,638—Yale, and showing the Yale suspension in a relative state of at rest, as when parked or else motoring down a relatively smooth level roadway.

Figure 16B:
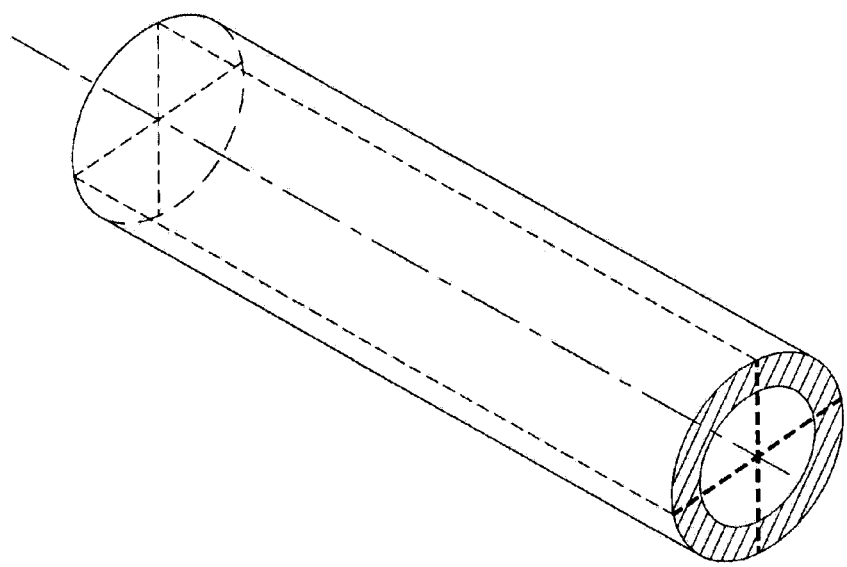
FIG. 16B is a stylized perspective view of the axle tube in isolation of the non-slipper type leaf spring suspension system of FIG. 16A, and showing the corresponding at rest state for the axle tube in FIG. 16A.

FIG. 16B is a stylized perspective view of the axle tube in isolation of the non-slipper type leaf spring suspension system of FIG. 16A, and showing the corresponding at rest state for the axle tube in FIG. 16A.

The disclosure in U.S. Pat. No. 5,271,638—Yale, only discloses eyed leaf springs with a rear shackle, and not leaf springs with slipper type ends at both ends and with a torque arm to control brake forces.

As for air springs, the disclosure in U.S. Pat. No. 5,271,638—Yale recites in part as follows.

Figure 4:
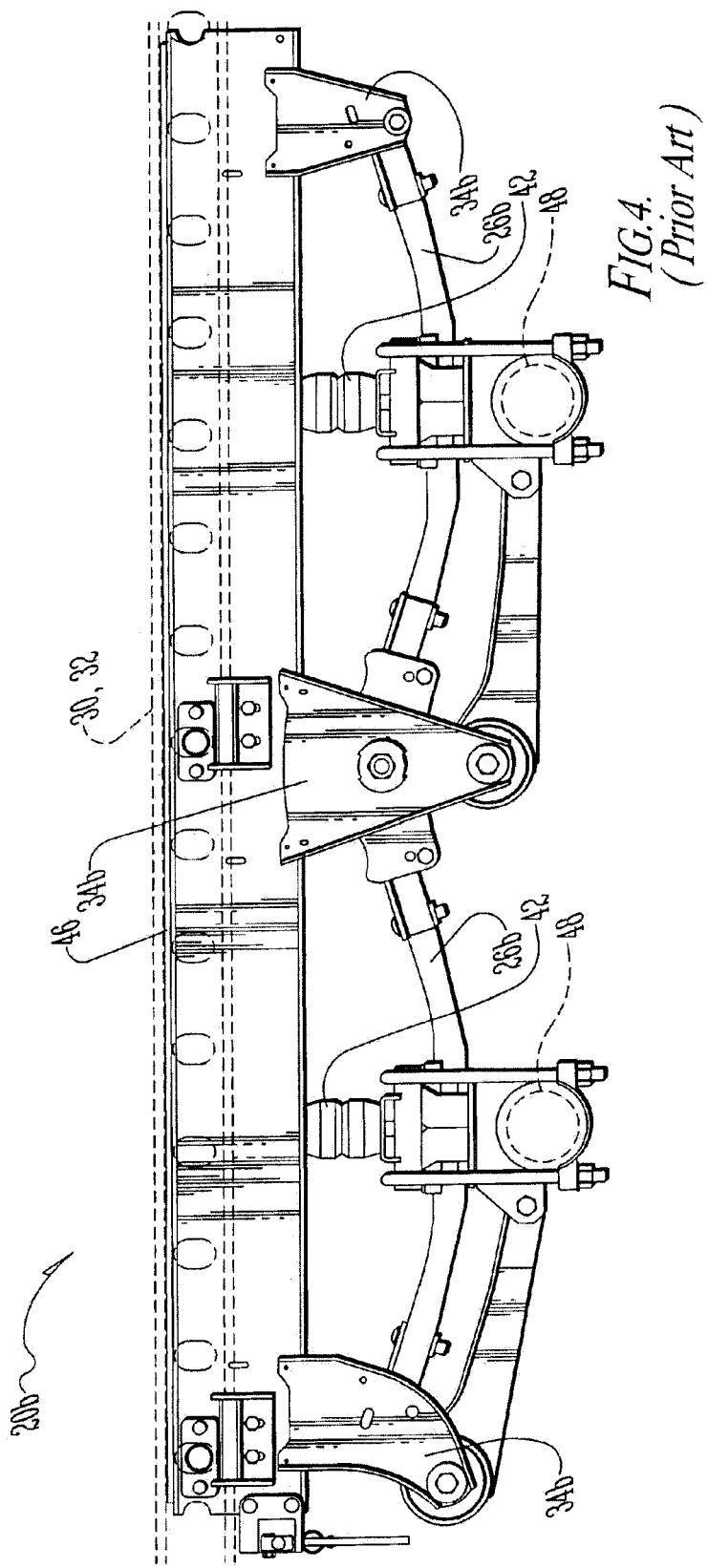
FIG. 4 is a left side elevational view of the mechanical suspension with a jounce bumper in accordance with the prior art of FIG. 3.
Figure 5:
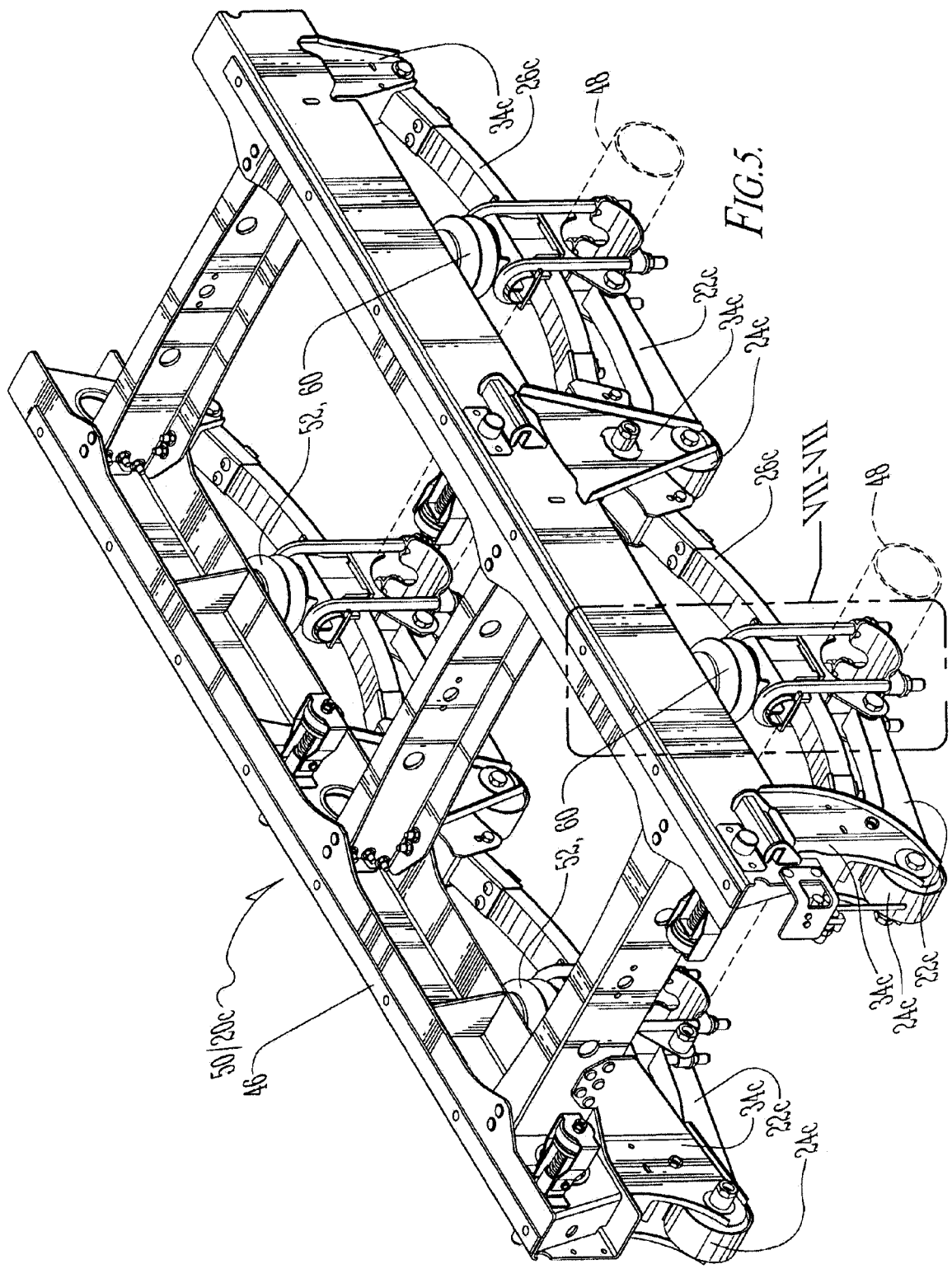
FIG. 5 is a perspective view of a mechanical slider suspension in accordance with the invention that is optimized with an air ride.
Figure 6:
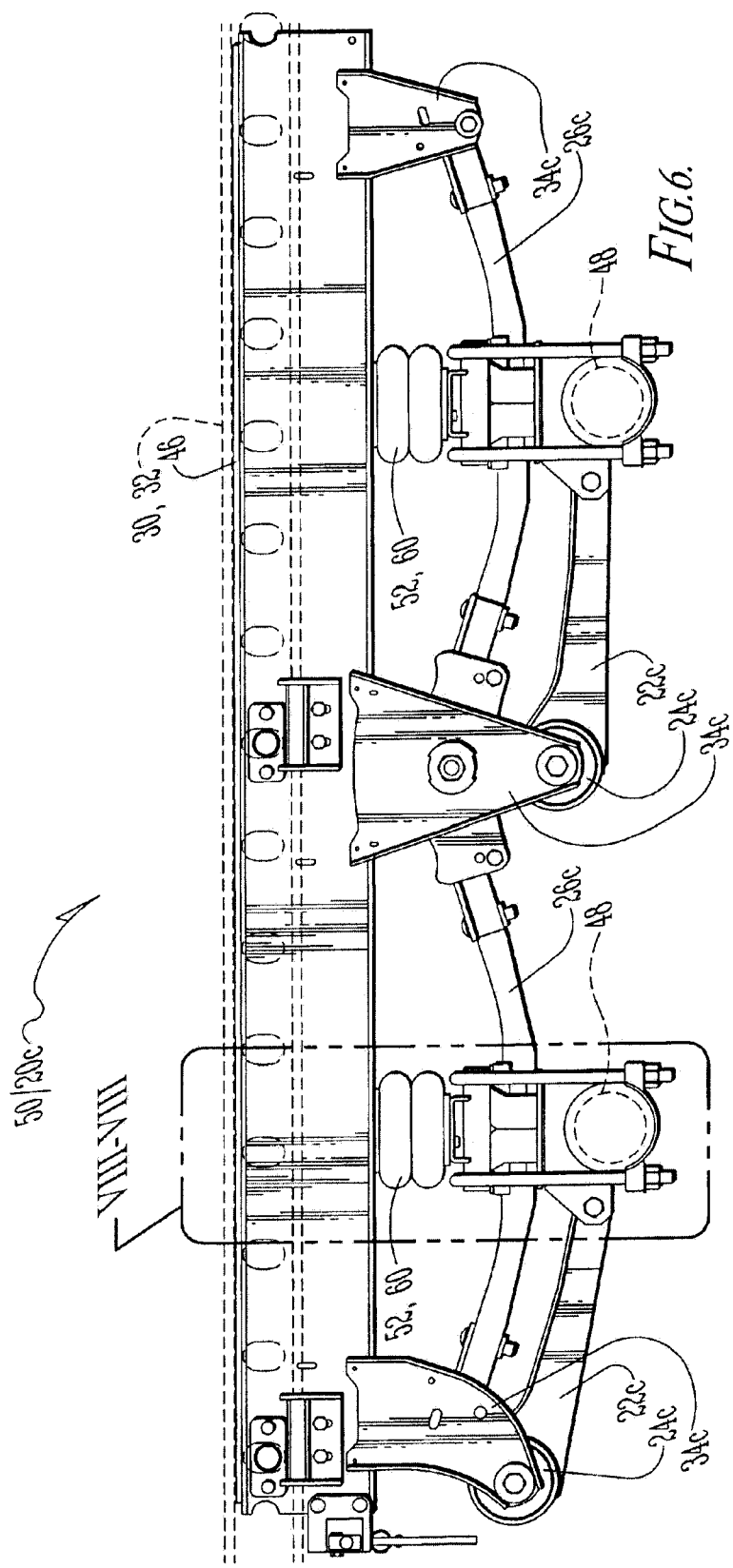
FIG. 6 is a left side elevational view thereof.
Figure 7:
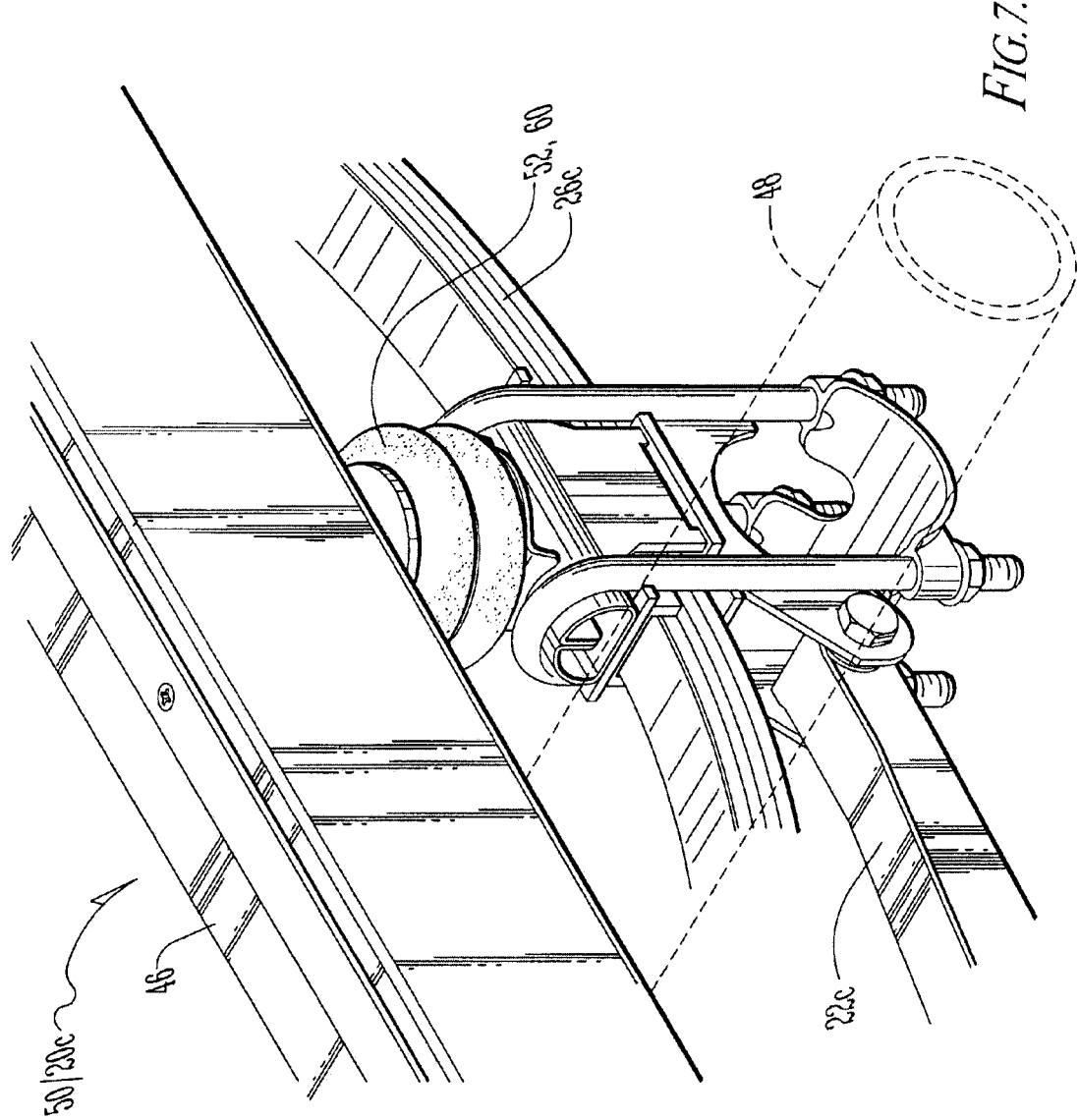
FIG. 7 is an enlarged-scale perspective view of detail VII-VII in FIG. 5.
Figure 8:
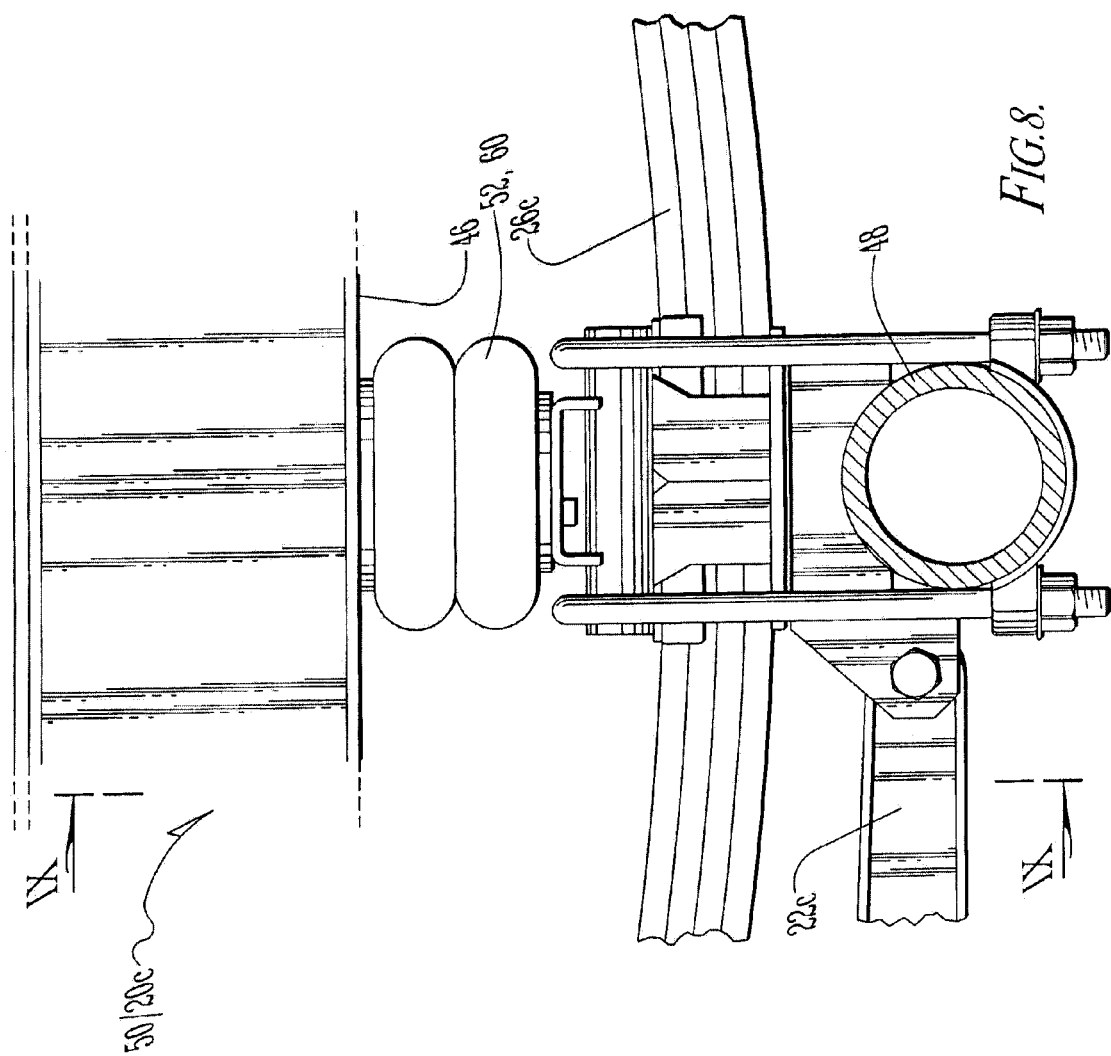
FIG. 8 is an enlarged-scale side elevational view of the detail VIII-VIII in FIG. 6.

The lower air spring bracket or saddle 19 can be sized in length to allow the air spring bellows 39A to be mounted adjacent and close to the axle bracket 60 as shown in FIG. 9. The saddle 19 can be of an extended length as shown in FIG. 4 so that the air spring bellows can still be secured to the axle bracket assembly 48 but the air spring is located more remotely from the axle bracket 48 so that the air bellows 18 applies force to the leaf spring 24 at a distance from the axle bracket. This distance is preferably in the range of up to one-half or more preferably ¼ of the distance from the axle bracket to the rear spring shackle. [Col. 8, lines 52-64.]

Figure 17A:
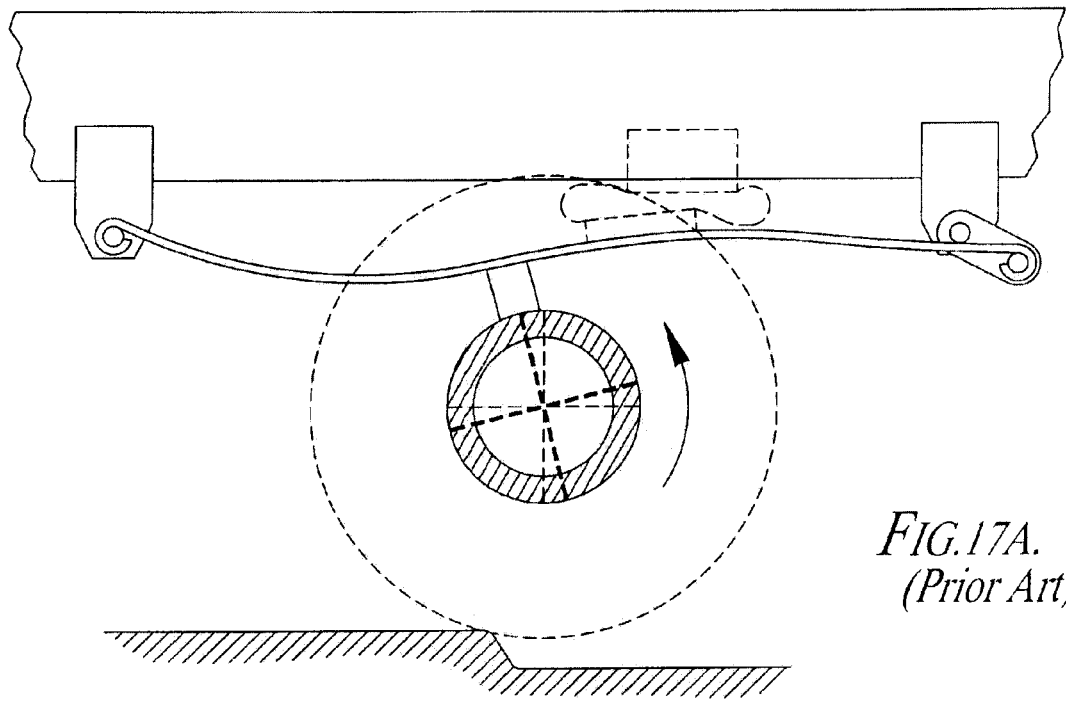
FIG. 17A is a stylized side elevation view comparable to FIG. 16A except showing the state of the non-slipper type leaf spring suspension system of FIG. 16A upon the occasion hitting a bump in the road.

FIG. 17A shows the probable explanation for why the disclosure in U.S. Pat. No. 5,271,638—Yale prefers it this way.

FIG. 17A is a stylized side elevation view comparable to FIG. 16A except showing the state of the non-slipper type leaf spring suspension system of FIG. 16A upon the occasion hitting a bump in the road.

The leaf spring in of the non-slipper type leaf spring suspension system of FIG. 16A contorts into a sine wave. The front half of the leaf spring "dives" and the rear half arches. The disclosure in U.S. Pat. No. 5,271,638—Yale places its air spring on the node of the arch. Nevertheless, the air spring undergoes a shear, and, the axle is twisted.

Figure 17B:
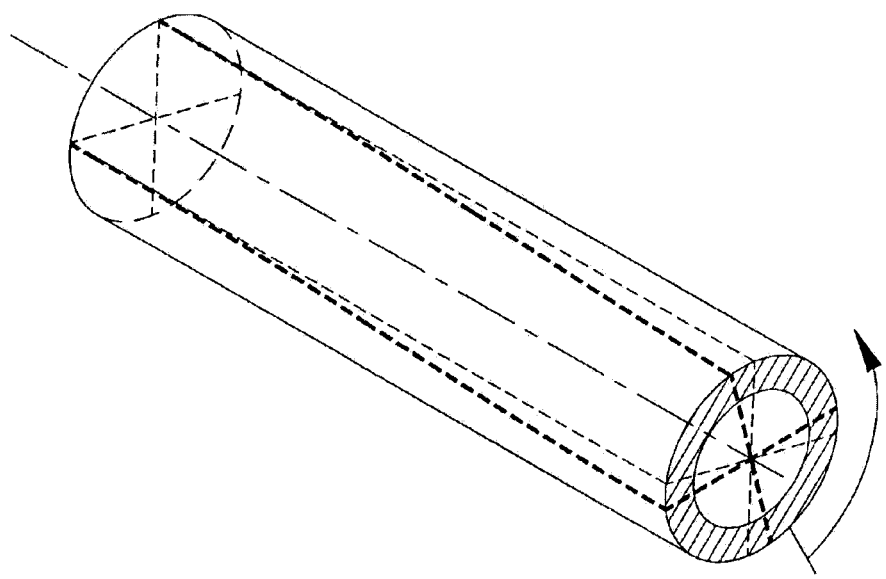
FIG. 17B is a stylized perspective view comparable to FIG. 17B except showing a twisted state for the axle tube given the conditions of FIG. 17A.
Figure 18:
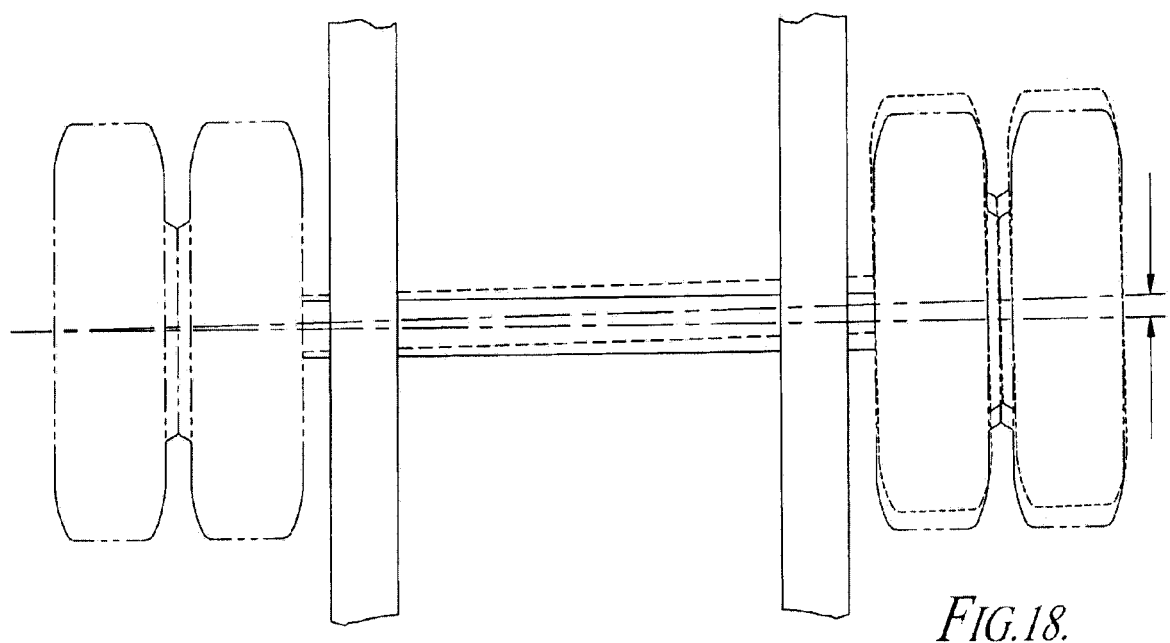
FIG. 18 is a stylized top plan view of FIG. 17A to give an overhead view axle tube wherein the state of the axle tube is not only twisted (eg., as shown by FIG. 17B) but is also undergoing a bending displacement.

Indeed, FIG. 17B is a stylized perspective view comparable to FIG. 17B except showing a twisted state for the axle tube given the conditions of FIG. 17A;

FIG. 18 is a stylized top plan view of FIG. 17A to give an overhead view axle tube wherein the state of the axle tube is not only twisted (eg., as shown by FIG. 17B) but is also undergoing a bending displacement.

Figure 19:
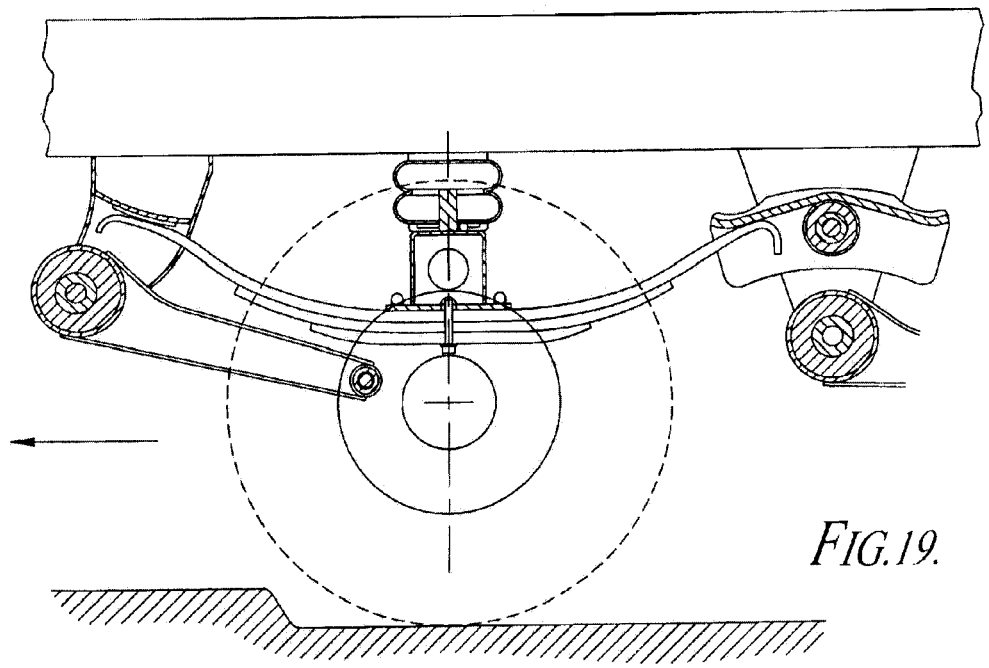
FIG. 19 is a stylized side elevation view comparable to FIG. 16A except showing the mechanical slider suspension in accordance with the invention that is optimized with an air ride in accordance with the invention, and, showing it in a similar state as the FIG. 16A suspension is shown in FIG. 16A (eg., in a relative state of at rest, as when parked or else motoring down a relatively smooth level roadway)

FIG. 19 is a stylized side elevation view comparable to FIG. 16A except showing the mechanical slider suspension in accordance with the invention that is optimized with an air ride in accordance with the invention, and, showing it in a similar state as the FIG. 16A suspension is shown in FIG. 16A (eg., in a relative state of at rest, as when parked or else motoring down a relatively smooth level roadway).

Figure 20:
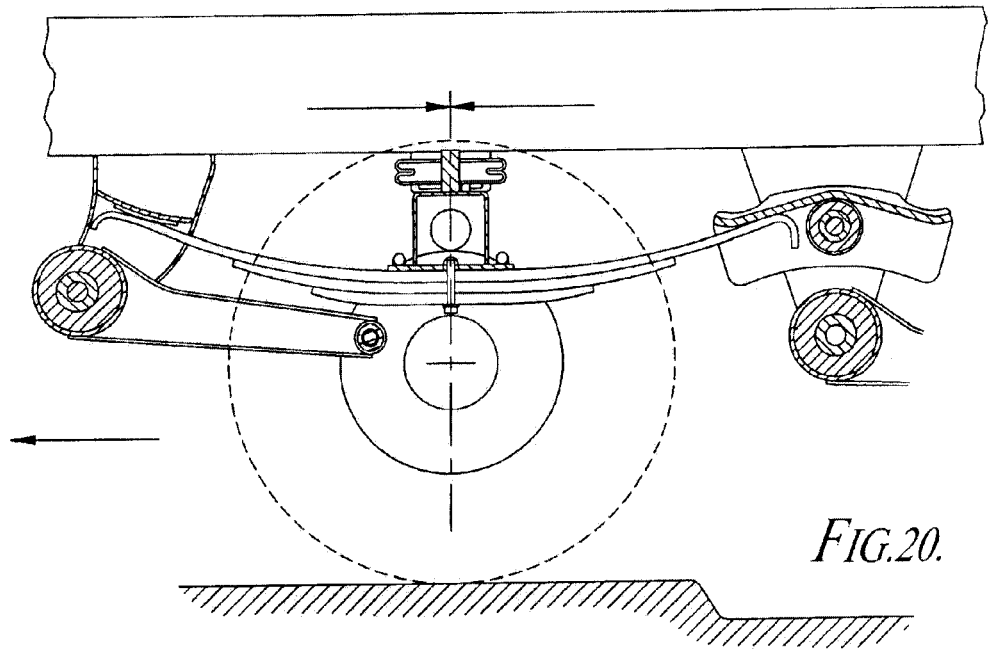
FIG. 20 is a stylized side elevation view comparable to FIG. 19 except showing the mechanical slider suspension in accordance with the invention that is optimized with an air ride in accordance with the invention in a similar state as the FIG. 16A suspension after the conditions shown in FIG. 16B (eg., after or upon the occasion hitting a bump in the road).

FIG. 20 is a stylized side elevation view comparable to FIG. 19 except showing the mechanical slider suspension in accordance with the invention that is optimized with an air ride in accordance with the invention in a similar state as the FIG. 16A suspension after the conditions shown in FIG. 16B (eg., after or upon the occasion hitting a bump in the road). Due to the torque arm the free sliding displacement of the front and back slipper ends of the leaf spring:

the compression of the air spring is on-axis (ie., no to nearly non-existent shear); and, the axle is not twisted (ie., none to no really measurable/discernible twist).

Double-ended slipper-end slipper springs (leaf springs without a bushing eye at front or rear, or a shackle at front or rear) are distinctive and advantageous for such reasons as the following, ie., that double-ended slipper-end slipper springs:

have higher load capacity than eyed springs, used for heavy duty semi-trailers;

eliminate spring eye bushing parts, thus there is no vertical load on bushings;

are not only more readily available at trailer service centers and at lower cost than eyed springs;

but also are available in a greater ranges of versions insofar as a greater range of capacity and number of leaves than eyed springs for different applications; as well as have independent axle torque arms to control brake forces to confine movement to a for more vertical movement of the spring and axle for better ride control.

The following U.S. Patent documents invented by Jason M. Klein, whether invented in whole or in part by him (and where he is co-inventor hereof) are incorporated herein by this reference thereto as if fully set forth hereinbelow:—

U.S. Pat. No. 7,267,348 entitled VEHICULAR SUSPENSION SYSTEMS, Jason M. Klein et al.;

U.S. Pat. No. 8,919,793 entitled LATERAL-STABILITY PROMOTING SEMI-TRAILER SUSPENSION, Jason M. Klein et al.;

U.S. Pat. No. 9,505,284 entitled LATERAL-STABILITY PROMOTING SEMI-TRAILER SUSPENSION, Jason M. Klein et al.;

U.S. Pat. No. 10,011,153 entitled SUSPENSION FOR VANS OR SEMI-TRAILERS MOUNTED UNDER A SLIDING FRAME, WHICH FRAME HAS BOLTED-IN CROSS MEMBERS, INDEPENDENT AIR SPRING TOWERS, AND, OIL-FREE SHOCKS, Jason M. Klein;

U.S. patent application Ser. No. 16/182,824 entitled MECHANISM AND SUSPENSION TO IMPROVE STABILITY AND HANDLING FOR KNUCKLE-BOOM LOADER TRAILERS IN OFF-ROAD CONDITIONS, Jason M. Klein et al.;

U.S. Pat. No. 10,370,033 entitled SLIDING SUB-FRAME FOR HEAVY-DUTY VEHICLE SUSPENSION, INCLUDING TORQUE BOX, AIR SLIDER PIN, AND SHEAR-OFF NUT, Jason M. Klein; and U.S. patent application Ser. No. 15/864,490 entitled LEAF-SPRING SUSPENSION SYSTEMS WITH COMPLIANT OVERSIZED PIVOT BUSHINGS, Jason M. Klein et al.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A vehicular heavy-duty suspension system combining a slipper mechanical leaf spring suspension with an assistant air spring, comprising:

an elongated leaf spring extending between a forward slipper end and a longitudinally-spaced rearward slipper end;

a torque arm elongated between a first end and a spaced second end;

a forward vehicle frame leaf spring hanger and a longitudinally-spaced rearward vehicle frame leaf spring hanger adapted to be hung from under the frame of a vehicle or a sliding subframe for the vehicle;

a pivot bushing supporting the first end of the torque arm and pivotally connected to either the forward vehicle frame leaf spring hanger or the rearward vehicle frame leaf spring hanger;

an assistant air spring comprising a resilient air bladder encompassing a gas filled interior and extending between a lower end connected to rigid bottom hardware and an upper end connected to a rigid upper hardware;

wherein the rigid upper hardware is mounted affixed under the frame of a vehicle or the sliding subframe for the vehicle intermediate of the forward vehicle frame leaf spring hanger and the rearward vehicle frame leaf spring hanger;

wherein the rigid bottom hardware is mounted affixed on top of the leaf spring intermediate the forward slipper end and rearward slipper end;

wherein the leaf spring props up the forward vehicle frame leaf spring hanger and the rearward vehicle frame leaf spring hanger by the forward and rearward slipper ends of the leaf spring or else by forward end margins proximate the forward slipper end and rearward end margins proximate the rearward slipper end;

wherein the leaf spring is shallowly bowed between the forward slipper end and rearward slipper end thereof wherein the heavy-duty suspension system further comprises an elongated axle extending between spaced left and right ends;

wherein the axle is disposed directly underneath the assistant air spring and connected by the rigid bottom hardware thereof;

wherein the torque arm pivot bushing is pivotally connected to the forward vehicle frame leaf spring hanger;

wherein the second end of the torque arm is connected to the rigid bottom hardware connected to the lower end of the resilient air bladder of the assistant air spring;

the second end of the torque arm is connected to the rigid bottom hardware connected to the lower end of the resilient air bladder of the assistant air spring and forward of the axle; and wherein the leaf spring, the torque arm and the assistant air spring are arranged in common to be symmetrically aligned about a vertical longitudinal plane of symmetry therefor, and whereby eliminating inherent twist in the system and supporting loads in the vertical longitudinal plane of symmetry which is common thereamong.

2. The heavy-duty suspension system of claim 1, wherein:
the forward and rearward end margins of the leaf spring comprise forward and rearward slipper portions respectively; and
the forward and rearward vehicle frame leaf spring hangers comprise respective wear portions engaging for the forward and rearward slipper portions respectively of the leaf spring.

3. The heavy-duty suspension system of claim 1, wherein:
the assistant air spring comprises a convolute style air spring wherein the resilient air bladder comprises at least one girdle intermediate the upper and lower ends thereof partitioning the interior into at least one and another relatively upper and lower chambers.

4. The heavy-duty suspension system of claim 3, wherein:
the assistant air spring further comprises a generally cylindrical rubber or neoprene bumper standing up in the interior of the resilient air bladder off the rigid bottom hardware.

5. The heavy-duty suspension system of claim 4, wherein:
the girdle of the resilient air bladder is characterized by an elevation above the lower end of the resilient air bladder;
the air resilient air bladder has an interior sidewall that is characterized by a minor diameter at the elevation of the girdle; and
the bumper is characterized by a height above the lower end of the resilient air bladder and has an upper surface proximate the height of the bumper characterized by an outside diameter;
wherein the height of the bumper, the outside diameter of the bumper proximate the upper surface and the minor diameter of the interior sidewall of the resilient air bladder at the elevation of the girdle are sized and proportioned for relatively specific internal air dampening performance.

6. The heavy-duty suspension system of claim 1, wherein:
wherein the rigid upper hardware is mounted affixed under the frame of a vehicle or the sliding subframe for the vehicle centered between the forward vehicle frame leaf spring hanger and the rearward vehicle frame leaf spring hanger.

7. The heavy-duty suspension system of claim 6, wherein:
wherein the rigid bottom hardware is mounted on top of the leaf spring centered between the forward slipper end and rearward slipper end.

8. The heavy-duty suspension system of claim 1, wherein:
the leaf spring comprises an elongated structure of steel;
the forward vehicle frame leaf spring hanger comprises a forward wear pad and the rearward vehicle frame leaf spring hanger comprises a rearward wear pad; and
the leaf spring props up the forward vehicle frame leaf spring hanger and the rearward vehicle frame leaf spring hanger by the forward and rearward slipper ends of the leaf spring or else by forward end margins proximate the forward slipper end and rearward end margins proximate the rearward slipper end engaging the forward and rearward wear pads, respectively.

9. The heavy-duty suspension system of claim 1, wherein:
the leaf spring comprises an elongated structure of composite material;
the forward vehicle frame leaf spring hanger comprises a forward slip/wear pad and the rearward vehicle frame leaf spring hanger comprises a rearward slip/wear pad; and
the leaf spring props up the forward vehicle frame leaf spring hanger and the rearward vehicle frame leaf spring hanger by the forward and rearward slipper ends of the leaf spring or else by forward end margins proximate the forward slipper end and rearward end margins proximate the rearward slipper end engaging the forward and rearward slip/wear pads, respectively.

10. The heavy-duty suspension system of claim 1, wherein:
the assistant air spring further comprises internal reducing and shaping orifices that provide internal air dampening and thereby substitute in part for hydraulic shocks.

11. The heavy-duty suspension system of claim 10, further comprising:
an air system and an air height control valve used to regulate the pressure into the assistant air spring whereby to avoid overload as well as to eliminate spring slap.

12. The heavy-duty suspension system of claim 1, further comprising:
an air system and an air height control valve used to regulate the pressure into the assistant air spring whereby to avoid overload as well as to eliminate spring slap.

13. The heavy-duty suspension system of claim 1, wherein:
the rigid upper hardware for the resilient air bladder of the assistant air spring comprises a bead plate.

14. A vehicular heavy-duty suspension system combining a slipper mechanical leaf spring suspension with an assistant air spring, comprising:
an elongated leaf spring extending between a forward slipper end and a longitudinally-spaced rearward slipper end;
a torque arm elongated between a first end and a spaced second end;
a forward vehicle frame leaf spring hanger and a longitudinally-spaced rearward vehicle frame leaf spring hanger adapted to be hung from under the frame of a vehicle or a sliding subframe for the vehicle;
a pivot bushing supporting the first end of the torque arm and pivotally connected to either the forward vehicle frame leaf spring hanger or the rearward vehicle frame leaf spring hanger;
an assistant air spring comprising a resilient air bladder encompassing a gas filled interior and extending between a lower end connected to bottom hardware and an upper end connected to a upper hardware;

wherein the upper hardware is mounted under the frame of a vehicle or the sliding subframe for the vehicle relatively centered between the forward vehicle frame leaf spring hanger and the rearward vehicle frame leaf spring hanger;

wherein the bottom hardware is mounted on top of the leaf spring relatively centered between the forward slipper end and rearward slipper end;

wherein the leaf spring props up the forward vehicle frame leaf spring hanger and the rearward vehicle frame leaf spring hanger by the forward and rearward slipper ends of the leaf spring or else by forward end margins proximate the forward slipper end and rearward end margins proximate the rearward slipper end; and wherein the leaf spring, the torque arm and the assistant air spring are arranged in common to be symmetrically aligned about a vertical longitudinal plane of symmetry therefor, and whereby eliminating inherent twist in the system and supporting loads in the vertical longitudinal plane of symmetry which is common thereamong.

* * * * *